(12) United States Patent
Venkatakrishnan

(10) Patent No.: US 11,663,804 B2
(45) Date of Patent: May 30, 2023

(54) DETERMINING IMAGE SENSOR SETTINGS USING LIDAR

(71) Applicant: Micron Technology, Inc., Boise, ID (US)

(72) Inventor: Akshaya Venkatakrishnan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 17/339,040

(22) Filed: Jun. 4, 2021

(65) Prior Publication Data

US 2022/0394172 A1 Dec. 8, 2022

(51) Int. Cl.

| G06F 16/53 | (2019.01) |
| --- | --- |
| H04N 23/62 | (2023.01) |
| G01S 17/42 | (2006.01) |
| G01S 17/86 | (2020.01) |
| G06F 16/953 | (2019.01) |
| G06V 10/10 | (2022.01) |
| G06V 10/22 | (2022.01) |
| G06F 18/22 | (2023.01) |
| H04N 23/61 | (2023.01) |
| H04N 23/60 | (2023.01) |
| H04N 23/63 | (2023.01) |
| G06N 5/04 | (2023.01) |
| G06F 3/0482 | (2013.01) |

(52) U.S. Cl.
CPC ............. *H04N 23/62* (2023.01); *G01S 17/42* (2013.01); *G01S 17/86* (2020.01); *G06F 16/53* (2019.01); *G06F 16/953* (2019.01); *G06F 18/22* (2023.01); *G06V 10/10* (2022.01); *G06V 10/235* (2022.01); *H04N 23/61* (2023.01); *H04N 23/632* (2023.01); *H04N 23/635* (2023.01); *H04N 23/64* (2023.01); *G06F 3/0482* (2013.01); *G06N 5/04* (2013.01)

(58) Field of Classification Search
CPC .................................................. H04N 5/23216
USPC ....................................................... 348/222.1
See application file for complete search history.

(56) References Cited

U.S. PATENT DOCUMENTS

| 4,796,997 A | 1/1989 | Svetkoff |
| --- | --- | --- |
| 2010/0046802 A1 | 2/2010 | Watanabe |
| 2012/0249738 A1 | 10/2012 | Gilboa |
| 2017/0039765 A1 | 2/2017 | Zhou |

(Continued)

*Primary Examiner* — Joel W Fosselman

(74) *Attorney, Agent, or Firm* — Brooks, Cameron & Huebsch, PLLC

(57) ABSTRACT

Methods and devices related to determining image sensor settings using LiDAR are described. In an example, a method can include receiving, at a processing resource via a LiDAR sensor, first signaling indicative of location data, elevation data, and/or light energy intensity data associated with an object, receiving, at the processing resource via an image sensor, second signaling indicative of data representing an image of the object, generating, based at least in part on the first signaling, additional data representing a frame of reference for the object, transmitting to a user interface third signaling indicative of the data representing the frame of reference for the object and the data representing the image of the object, and displaying, at the user interface and based at least in part on the third signaling, another image that comprises a combination of the frame of reference and the data representing the image.

18 Claims, 4 Drawing Sheets

(56) References Cited

U.S. PATENT DOCUMENTS

2017/0076508 A1 3/2017 VonBlon
2020/0071912 A1* 3/2020 Kennedy ................ G06V 20/17

* cited by examiner

DETERMINING IMAGE SENSOR SETTINGS USING LIDAR

TECHNICAL FIELD

The present disclosure relates to determining image sensor settings using Light Detection and Ranging (LiDAR).

BACKGROUND

A computing device can be a smartphone, a wearable device, a tablet, a laptop, a desktop computer, or a smart assistant device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1:
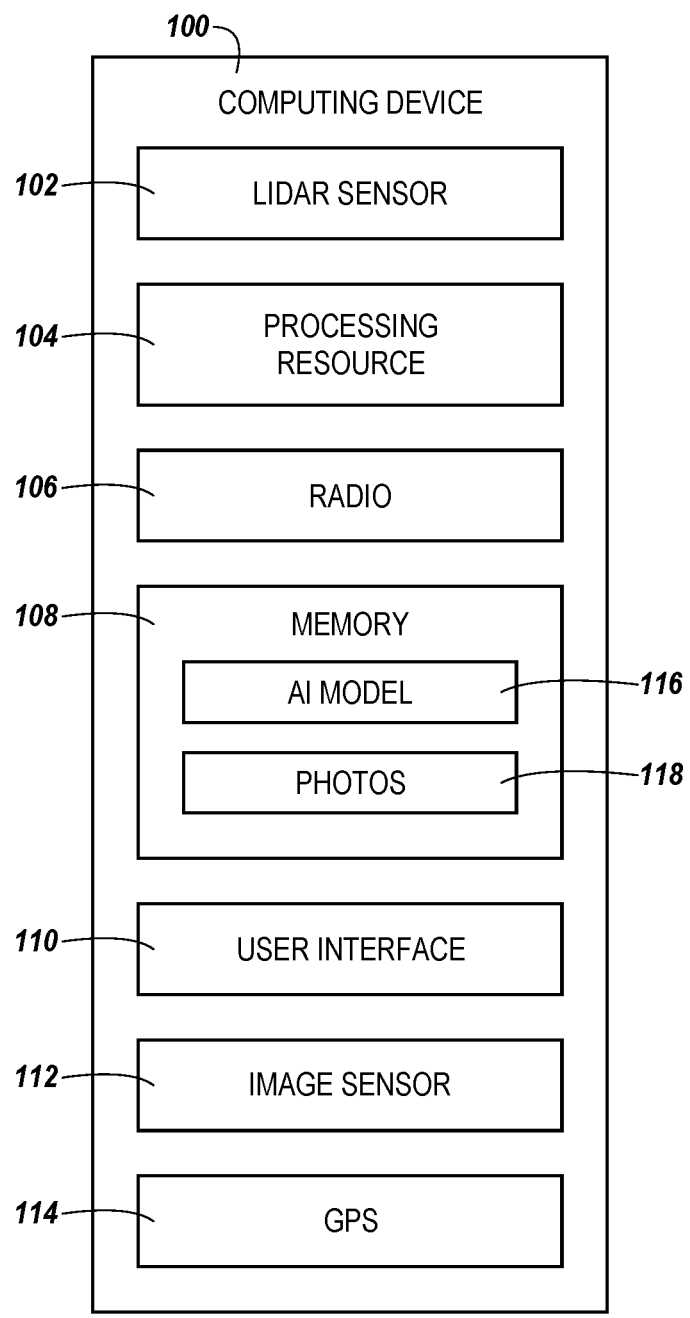
FIG. 1 illustrates an example of a computing device for determining image sensor settings using LIDAR in accordance with a number of embodiments of the present disclosure.

The present disclosure includes methods and apparatuses related to receiving, at a processing resource of a computing device via a LiDAR sensor, first signaling indicative of location data, elevation data, and/or light energy intensity data associated with an object and receiving, at the processing resource via an image sensor, second signaling indicative of data representing an image of the object. Additional data representing a frame of reference for the object can be generated based on the first signaling and third signaling indicative of the data representing the frame of reference for the object and the data representing the image of the object can be transmitted to the user interface. In some examples, the user interface can display another image that comprises a combination of the frame of reference and the data representing the image based on the third signaling.

Often photographs (e.g. photos) are modified, edited, and/or photoshopped after being captured. For example, a filter can be applied to a photo and/or portions of a photo can be removed. However, modifying a photo after capturing the photo can be limiting. In some examples, the angle at which the photo is taken, the brightness, the mode, the camera type, and/or the exposure time used may not be ideal for the photo and editing tools may not be able to fix or modify the photo to the extent needed. As such, adjusting image sensor settings and/or a frame of reference prior to capturing a photo can produce a better and/or higher quality photo than a photo modified after capture.

Image sensor settings and/or a frame of reference can be generated based on data from a LiDAR sensor, an image sensor, a memory 108 on and/or external to the apparatus, the Internet, a cloud device, and/or a Global Positioning System (GPS). Image sensor settings can include focus, brightness, contrast, camera mode, camera type, flash, and/or exposure length, for example. The image sensor settings can be displayed on a user interface as a recommendation to the user and/or the image sensor settings can be adjusted by the computing device without a user input.

The frame of reference can be an angle and/or position of the camera that captures an improved photo. For example, lighting of a photo can be better at a different angle. The frame of reference and the live (e.g., current or streaming) image of the image sensor can be displayed on the user interface. The user can move the image sensor to align the frame of reference with the live image. Once, the live image is aligned with the frame of reference, the user can capture the photo via the user interface, a button, and/or a verbal command.

An artificial intelligence (AI) model can be taught to generate image sensor settings and/or a frame of reference. For example, the AI model can learn what constitutes a good photo and/or a user's photo preferences and generate image sensor settings to capture good photo and/or photos the user will like.

As used herein, "a number of" something can refer to one or more of such things. A "plurality" of something intends two or more. The figures herein follow a numbering convention in which the first digit or digits correspond to the drawing figure number and the remaining digits identify an element or component in the drawing. Similar elements or components between different figures may be identified by the use of similar digits. For example, reference numeral 116 may reference element "16" in FIG. 1, and a similar element may be referenced as 216 in FIG. 2. In some instances, a plurality of similar, but functionally and/or structurally distinguishable, elements or components in the same figure or in different figures may be referenced sequentially with the same element number. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a computing device 100 for determining image sensor settings using LIDAR in accordance with a number of embodiments of the present disclosure. The computing device 100 can be, but is not limited to, a smartphone, a wearable device, a tablet, a laptop, a desktop computer, a smart assistant device, or any combination thereof.

A LiDAR sensor 102, a processing resource 104, a radio 106, a memory 108, a user interface 110, an image sensor 112, and/or a global positioning system (GPS) 114 can be included in and/or coupled to the computing device 100. The computing device 100 can receive and/or transmit data via wired and/or wireless transmissions using a communication device (e.g., intermediary device), such as, but not limited to a radio 106. The radio 106 through signaling (e.g., radio signals) and/or a network relationship can enable the computing device 100 to communicate with one or more components of the computing device 100, one or more other computing devices, wearable devices, telephones, sensors, smart assistants, and/or cloud computing devices. Examples of such a network relationship can include Bluetooth, AirDrop, a peer-to-peer Wi-Fi network, a cellular network, a distributed computing environment (e.g., a cloud computing environment), a wide area network (WAN) such as the Internet, a local area network (LAN), a personal area network (PAN), a campus area network (CAN), or metropolitan area network (MAN), among other types of network relationships.

The memory 108 can include volatile and/or non-volatile memory, for instance, DRAM, NAND, and/or 3D Crosspoint. The memory 108 can be coupled to the processing resource 104 and can store an AI model 116 and/or photos 118. The memory 108 can be any type of storage medium that can be accessed by the processing resource 104 to perform various examples of the present disclosure. For example, the memory 108 can be a non-transitory computer readable medium having computer readable instructions (e.g., computer program instructions) stored thereon that are executable by the processing resource 104 to receive, at the processing resource 104 of the computing device 100 via the LiDAR sensor 102, first signaling indicative of at least one of location data, elevation data, or light energy intensity data, or any combination thereof, receive, at the processing resource 104 of the computing device 100 via the image sensor 112, second signaling indicative of data representing an image of the object, generate, based at least in part on the first signaling, additional data representing a frame of reference for the object, transmit to the user interface 110 third signaling indicative of the data representing the frame of reference for the object and the data representing the image of the object, and display, at the user interface 110 and based at least in part on the third signaling, another image that comprises a combination of the frame of reference and the data representing the image.

In some examples, the processing resource 104 can receive signaling indicative of data representing a number of photos 118 from the Internet, a cloud device, and/or memory 108 on and/or external to the computing device 100, for example. Image sensor settings can be generated and transmitted based on location data, elevation data, light energy intensity data, data representing an image of the object and/or the data representing the number of photos 118. In a number of embodiments, the image sensor settings can be received and displayed on the user interface 110 and/or the image sensor 112 can adjust the image sensor settings in response to receiving the image sensor settings.

The user interface 110 can be generated by computing device 100 in response to receiving signaling from the processing resource 104. The user interface 110 can be a graphical user interface (GUI) that can provide and/or receive information to and/or from the user of the computing device 100. In a number of embodiments, the user interface 106 can be shown on a display and/or hologram of the computing device 100.

A user can receive data and/or transmit selections (e.g., commands) via the user interface 110. For example, the user interface 110 can display a number of options and the user interface 110 can receive a selection of one or more of the number of options in response to the user selecting the one or more options on the user interface 110. In some examples, the user interface 110 can receive an input of image sensor settings, a selection of image sensor settings, and/or a selection to capture a photo. In response to an input, the user interface 110 can transmit signaling to the image sensor 112 including data representing the image sensor settings and/or data representing a command to capture a photo.

Image sensor settings and/or a frame of reference can be derived from data representing a location of the computing device 100 generated by GPS 114. The data representing the location of the computing device 100 can be transmitted from the GPS 114 to the processing resource 104 and the processing resource 104 and/or the AI model 116 can generate the data representing the image sensor settings and/or the frame of reference based at least in part on the data representing the location of the computing device 100. In response to receiving the data representing the location of the computing device, the processing resource 104 can search for a plurality of photos 118 on the Internet, a cloud device, and/or a memory 108 on and/or external to the computing device 100 that were captured within a particular distance from the location of the computing device 100. The processing resource 104 can receive the signaling indicative of data representing the plurality of photos 118 in response to finding the plurality of photos 118 that were captured within the particular distance from the location of the computing device 100.

In some examples, the processing resource 104 can search for and receive a plurality of photos 118 from the Internet, a cloud device, and/or memory 108 on and/or external to the computing device 100 that were captured under similar conditions. These similar conditions can include images captured within a particular distance, as discussed above, at a particular angle, during a particular time of day, during a particular weather pattern, and/or during a particular season, for example.

The data representing the plurality of photos 118 received from the Internet including metadata associated with each of the plurality of photos 118 can be stored in memory 108. The metadata can include a number of views, a number of likes, and/or a number of shares a photo has. In some examples, the data representing the number of image sensor settings and/or the data representing the frame of reference can be generated by the processing resource 104 based at least in part on the data representing the plurality of photos 118.

The processing resource 104 can select a number of photos of the plurality of photos 118 based at least in part on the number of views, number of likes, and/or a number of shares a photo has. For example, the data representing the number of image sensor settings and/or the data representing the frame of reference can be generated based on popular and/or well-liked photos to assist a user of the computing device to capture a quality and/or good photo.

In a number of embodiments, a plurality of photos 118 and metadata of the plurality of photos 118 can be stored in memory 108. The plurality of photos 118 can be photos from the Internet, as previously described, and/or photos previously captured, received, and/or downloaded by the user of the computing device 100. The plurality of photos 118 can be transmitted from the memory 108 in response to receiving a request from the processing resource 104. The processing resource 104 can select a number of photos from the plurality of photos 118 based at least in part on metadata of a photo including subject matter, number of uploads, number of views, number of likes, and/or number of shares a photo has. In some examples, the user interface 110 can display the plurality of photos 118, receive a selection of a number of photos of the plurality of photos 118 from a user, and transmit data representing the number of photos to the processing resource 104. For example, a user can select a number of photos they like from the plurality of photos 118. Image sensor settings and/or a frame of reference can be derived from data representing the number of photos selected from the plurality of photos 118. For example, the data representing the number of image sensor settings and/or the data representing the frame of reference can be generated based on the number of photos liked by the user of the computing device 100.

In some examples, the image sensor settings and/or the frame of reference can be displayed on the user interface 110 and/or commands for the image sensor 112 can be created and executed based on the image sensor settings. For example, data representing a notification can be generated based on the data representing the number of image sensor settings, transmitted to the user interface 110, and displayed on the user interface 110. The user can select and/or ignore the image sensor settings and/or the frame of reference displayed on the user interface 110. In some examples, data representing a command can be generated based on the data representing the number of image sensor settings, transmitted to the image sensor 112, and the image sensor 112 can adjust the number of image sensor settings.

The processing resource 104 can include components configured to enable the computing device 100 to perform AI operations. In some examples, AI operations may include training operations or interference operations, or both. In a number of embodiments, the AI model 116 can be trained remotely in a cloud using sample data and transmitted to the computing device 100 and/or trained on the computing device 100. In some examples, the data representing the frame of reference and/or data representing a number of image sensor settings can be generated by performing an AI operation on location data, elevation data, light energy intensity data, data representing an image of an object, data representing a number of photos 118, and/or data representing a location of the computing device 100 using the AI model 116.

Figure 2:
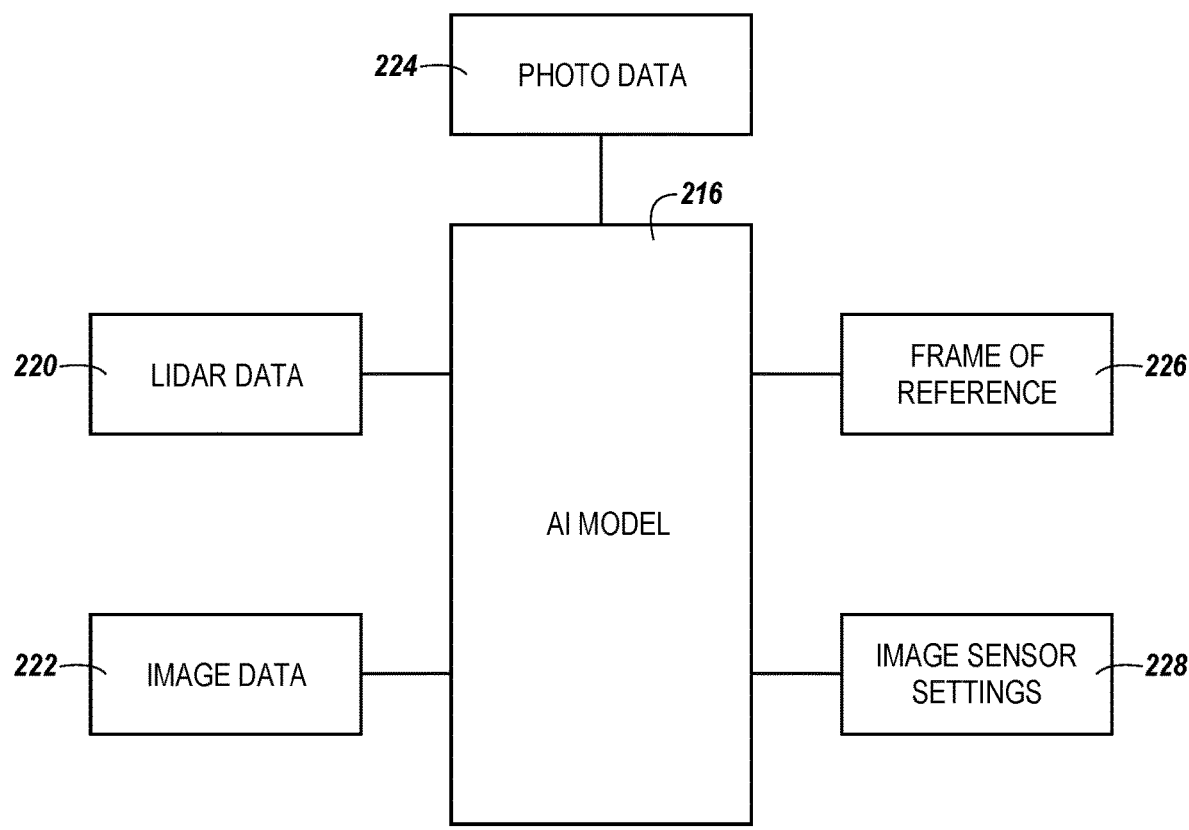
FIG. 2 illustrates an example of a flow diagram for determining image sensor settings using an AI model in accordance with a number of embodiments of the present disclosure.

FIG. 2 illustrates an example of a flow diagram for determining image sensor settings using an AI model 216 in accordance with a number of embodiments of the present disclosure. AI model 216 can correspond to AI model 116 in FIG. 1. The AI model 216 can receive LiDAR data 220, image data 222, and/or photo data 224. In some examples the AI model 216 can receive data and generate a frame of reference 226 and/or image sensor settings 228.

The LiDAR data 220 can include location data, elevation data, and/or light energy intensity data associated with an object and can be generated by a LiDAR sensor (e.g., LiDAR sensor 102 in FIG. 1). LiDAR data 220 can include data points having associated X, Y, and Z coordinate values and light energy intensity values. For example, the location associated with a light energy intensity value can be the X and Y coordinates and the elevation associated with the light energy intensity value can be the Z coordinate. The LiDAR data 220 can be inputted into the AI model 216 and the AI model 216 can determine a frame of reference 226 and/or image sensor settings 228 based on the LiDAR data 220. In some examples, the AI model 216 may determine the lighting of a photo taken from the current position of an image sensor (e.g., image sensor 112 in FIG. 1) and/or using the current image sensor settings may be too dark based on the LiDAR data 220. For example, the light intensity values of the coordinates of the object (e.g., subject matter) of the photo may be dark compared to the light intensity values of the coordinates of the background of the photo. Accordingly, the AI model 216 may determine a particular frame of reference 226 with a better angle and/or position to capture the image from to have a better lit photo and/or image sensor settings 228 that may brighten the object of the photo. For example, the frame of reference 226 may instruct the user to move the image sensor to an angle where the object is front lit and/or the image sensor settings 228 may be adjusted to enable a flash.

The image data 222 can be data representing an image of an object and can include a location, a time of day, and/or current sensor settings. The image data 222 can be a live image of the image of the object generated by an image sensor. In some examples, the image data 222 can be inputted into the AI model 216 and the AI model 216 can generate a frame of reference 226 and/or image sensor settings 228 based on the image data 222. For example, the AI model 216 may be able to determine the subject matter the user wishes to capture based on the image data 222. In some examples, the AI model 216 can determine the type of photo the user wishes to take. For example, if a significant portion of the image data 222 includes a person, the AI model 216 may determine the user wishes to capture a portrait. In response to determining the user wishes to capture a portrait, the AI model 216 may generate a frame of reference 226 that instructs the user to move closer or further away from the person in the portrait and/or generate image sensor settings 228 for a portrait.

The photo data 224 can be data representing a number of photos. The number of photos can be selected from a plurality of photos (e.g., photos 118 in FIG. 1) from the Internet, a cloud device, and/or a memory (e.g., memory 108 in FIG. 1) of a computing device (e.g., computing device 100 in FIG. 1). For example, the number of photos of the plurality of photos can be selected in response to the number of photos being captured within a particular distance from a location of an image of an object. The location of the image and/or object can be determined based on GPS (e.g., GPS 114 in FIG. 1) and/or a user identifying their location via social media and/or messages.

In a number of embodiments, the number of photos of the plurality of photos can be selected in response to identifying the image and/or object by performing image recognition on the image and/or object. In some examples, a user can select a portion of the image on the user interface, signaling, indicative of data representing a command, can be sent from the user interface to the processing resource in response to the user interface receiving the selection, and the processing resource can perform image recognition on the selected portion of the image. For example, an image sensor can capture a live image of the National Mall including the Washington Monument as the object. The computing device can compare data representing a portion of the image and/or object to other data representing images and/or objects to identify the image as the National Mall and the Washington Monument as the object and/or search and find other photos including a portion of the image and/or a portion of the object. For example, the computing device can search for a plurality of photos of the National Mall including the Washington Monument.

In some examples, the number of photos can be selected from the plurality of photos based on a number of views, a number of likes, and/or a number of shares. For example, well liked photos can be selected to be included in the photo data 224 and inputted into the AI model 216. In a number of embodiments, the number of photos of the plurality of photos can be selected from photos captured by the user based on a number of user views and/or a number of times the user has shared a photo via a message and/or social media. For example, commonly shared photos can be selected to be included in the photo data 224 and inputted into the AI model 216.

The AI model 216 can compare the number of photos included in the photo data 224 to determine commonalities. For example, the AI model 216 can determine that a majority of the number of photos are taken from a particular distance from an object. Accordingly, the AI model 216 can generate a frame of reference 226 and/or image sensor settings 228 to change with and/or without user input, the image sensor's zoom, lens, and/or its distance from an object.

In a number of embodiments, the AI model 216 can compare the number of photos from the photo data 224 to the live image from the image data 222 and/or the LiDAR data 220 to determine which photo and/or photos are closest to the live image. For example, if the live image is a landscape, the AI model 216 may determine the commonalities between the landscape photos of the number of photos. The AI model 216 may determine that the majority of the landscape photos of the number of photos have a particular brightness. In response to determining the particular brightness from the photo data 224, the AI model 216 can generate a frame of reference 226 and/or image sensor settings 228 to change with and/or without user input, the image sensor's brightness and/or its location.

The frame of reference 226 can be an angle and/or position of the image sensor that captures an improved photo. For example, a composition of a photo can be better at a different angle and/or a different position. The frame of reference 226 and the image data 222 (e.g., live image captured by the image sensor) can be displayed on a user interface (e.g., user interface 110 in FIG. 1). The user can move the image sensor to align the live image with the frame of reference 226. The frame of reference 226 can be an outline of one or more objects and/or an overlay of one or more objects in a particular position. Once the live image is aligned with the frame of reference 226 by placing the one or more objects of the live image in the same or similar position as the one or more objects in the frame of reference, the user can capture the photo. In some embodiments, the frame of reference 226 can include directions displayed on the user interface and/or outputted from a speaker of the computing device. For example, the frame of reference 226 may be instructions for a user to move in a particular direction and once the user has matched the live image with the frame of reference 226, the user can be instructed to capture the image.

The image sensor settings 228 can be displayed on the user interface as a notification and/or an option to select and/or outputted from a speaker of the computing device as a recommendation to the user. In some examples, the image sensor settings 228 can be adjusted by the computing device without a user. For example, the AI model 216 can output and transmit a command to the image sensor to adjust the image sensor settings 228. The image sensor settings 228 can include focus, framing (e.g., the frame of reference), brightness, contrast, camera mode, camera type, flash, and/or exposure length.

Figure 3A:
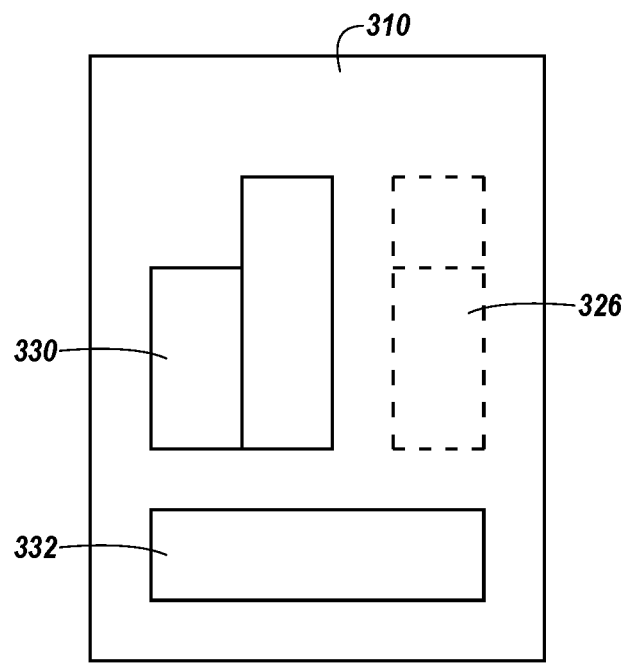
FIG. 3A illustrates an example of a user interface of a computing device in accordance with a number of embodiments of the present disclosure.

FIG. 3A illustrates an example of a user interface 310 of a computing device (e.g., computing device 100 in FIG. 1) in accordance with a number of embodiments of the present disclosure. The user interface 310 can correspond to user interface 110 in FIG. 1. The user interface 310 can display a live image 330, a frame of reference 326, and/or text 332.

The live image 330 can be an image being streamed from an image sensor (e.g., image sensor 112 in FIG. 1) and/or a LiDAR sensor (e.g., LiDAR sensor 102 in FIG. 1). The live image 330 can change in response to the image sensor and/or LiDAR sensor being moved and/or in response to image sensor settings (e.g., image sensor settings 228 in FIG. 2) being adjusted. The live image 330 in the example illustrated in FIG. 3A can include two buildings connected to each other.

Frame of reference 326 can correspond to frame of reference 226 in FIG. 2. The frame of reference 226 can be an outline and/or an overlay of one or more objects from a different angle and/or position than the one or more objects streaming in the live image 330 from the image sensor. The frame of reference 326 in the example illustrated in FIG. 3A can include the two buildings connected to each other as the one or more objects in the live image 330 and display the two buildings at a different angle than the two buildings streaming in the live image 330.

Text 332 can include notifications, recommendations, and/or instructions for changing image sensor settings 228, moving the image sensor to position the live image 330 to be within and/or within a range of the frame of reference 326, and/or capturing a photo. For example, the text 332 can include directions to move the image sensor in a different direction and/or adjust brightness, contrast, mode, type, flash, and/or exposure length of the image sensor.

Figure 3B:
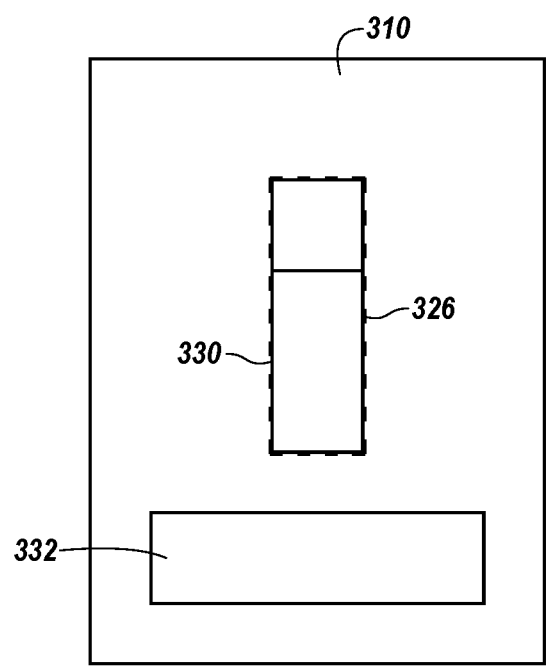
FIG. 3B illustrates an example of a user interface of a computing device in accordance with a number of embodiments of the present disclosure.

FIG. 3B illustrates an example of a user interface 310 of a computing device (e.g., computing device 100 in FIG. 1) in accordance with a number of embodiments of the present disclosure. The user interface 310 can correspond to user interface 110 in FIG. 1 and/or user interface 310 in FIG. 3B. The user interface 310 can display a live image 330, a frame of reference 326, and/or text 332, as previously described in connection with FIG. 3A.

A user can move an image sensor to align the live image 330 with the frame of reference 326, as illustrated in FIG. 3B. Once, the live image 330 is aligned with the frame of reference 326 and/or the image sensor settings are adjusted, the user can capture the photo via the user interface 310, a button, and/or a verbal command. In a number of embodiments, the text 332 can include instructions to capture an image in response to the live image 330 being within and/or within a range of the frame of reference 326 and/or in response to the image sensor settings being adjusted. In some examples, the computing device can capture the image without a user's input in response to the live image 330 being aligned with the frame of reference 326 and/or the image sensor settings being adjusted.

Figure 4:
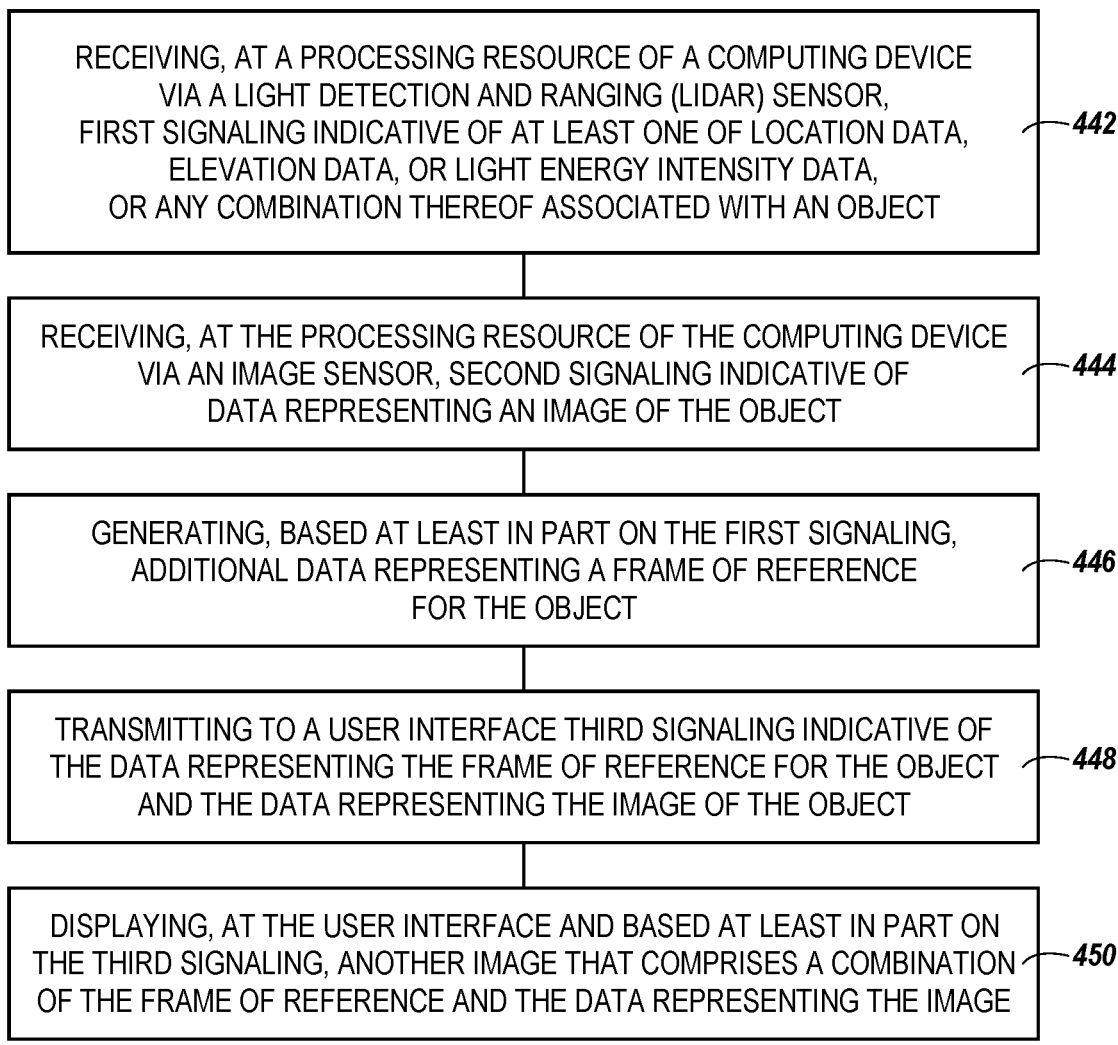
FIG. 4 is a flow diagram of a method for determining image sensor settings using LiDAR in accordance with a number of embodiments of the present disclosure.

FIG. 4 is a flow diagram of a method 440 for determining image sensor settings using LiDAR in accordance with a number of embodiments of the present disclosure. At block 442, the method 440 can include receiving, at a processing resource of a computing device via a LiDAR sensor, first signaling indicative of at least one of location data, elevation data, or light energy intensity data, or any combination thereof associated with an object. The object can be subject matter of an image, for example.

At block 444, the method 440 can include receiving, at the processing resource of the computing device via an image sensor, second signaling indicative of data representing an image of the object. In some examples, the image sensor can be a digital camera and/or a camera module.

At block 446, the method 440 can include generating, based at least in part on the first signaling, additional data representing a frame of reference for the object. The frame of reference can be an angle and/or position of the camera that captures an ideal photo.

At block 448, the method 440 can include transmitting to a user interface third signaling indicative of the data representing the frame of reference for the object and the data representing the image of the object. The user interface can be shown on a display and/or hologram of the computing device.

At block 450, the method 440 can include displaying, at the user interface and based at least in part on the third signaling, another image that comprises a combination of the frame of reference and the data representing the image. A user can move the camera to align the frame of reference with the live image. Once the live image is aligned with the frame of reference, the user can capture the photo.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, at a processing resource of a computing device via a Light Detection and Ranging (LiDAR) sensor, first signaling indicative of at least one of location data, elevation data, or light energy intensity data, or any combination thereof associated with an object;
   receiving, at the processing resource of the computing device via an image sensor, second signaling indicative of data representing an image of the object;
   generating, based at least in part on the first signaling, additional data representing a frame of reference for the object;
   transmitting to a user interface third signaling indicative of the data representing the frame of reference for the object and the data representing the image of the object;
   displaying, at the user interface and based at least in part on the third signaling, another image that comprises a combination of the frame of reference and the data representing the image;
   receiving, at the user interface, a selection from a user of the computing device;
   transmitting from the user interface to the image sensor fourth signaling indicative of data representing a command in response to the user interface receiving the selection; and
   capturing, at the image sensor, the image of the object in response to receiving the fourth signaling.

2. The method of claim 1, further comprising:
   determining, based at least in part on the first signaling, data representing at least one of: a location of the object, an angle of the object, a time, weather, or season;
   selecting a number of photographs of a plurality of photographs that are at least one of: captured within a particular distance from the location of the object, captured within a particular amount of degrees from the angle of the object, captured within a particular amount of time from the time, captured during the weather, or captured during the season; and
   generating, based at least in part on data representing the selected number of photographs, the additional data representing the frame of reference for the object.

3. The method of claim 2, further comprising selecting the number of photographs of the plurality of photographs from at least one of the Internet, a cloud device, or a memory of the computing device based at least in part on at least one of a number of views, a number of likes, or a number of shares, or any combination thereof.

4. The method of claim 2, further comprising selecting the number of photographs of the plurality of photographs from the computing device based at least in part on at least one of a number of user views or a number of shares, or any combination thereof.

5. The method of claim 1, further comprising determining data representing a number of image sensor settings based at least in part on the first signaling or the second signaling, or any combination thereof.

6. The method of claim 5, further comprising:
   generating, based at least in part on the data representing the number of image sensor settings, data representing a notification;
   transmitting to the user interface fifth signaling indicative of the data representing the notification; and
   displaying, at the user interface and based at least in part on the fifth signaling, the notification.

7. The method of claim 5, further comprising:
   generating, based at least in part on the data representing the number of image sensor settings, data representing a command;
   transmitting to the image sensor fifth signaling indicative of the data representing the command; and
   adjusting, at the image sensor and based at least in part on the fifth signaling, the number of image sensor settings.

8. The method of claim 1, further comprising:
   performing, at the processing resource, image recognition on the data representing the image of the object;
   generating data representing an identification of the object in response to performing the image recognition; and generating, based at least in part on the data representing the identification of the object, the data representing the frame of reference for the object.

9. The method of claim 8, further comprising:
receiving, at the user interface via the image sensor, the second signaling indicative of the data representing the image of the object;
displaying, at the user interface and based at least in part on the second signaling, the image of the object;
receiving a selection of a portion of the image on the user interface;
transmitting from the user interface to the processing resource fifth signaling indicative of data representing a command in response to the user interface receiving the selection; and
performing, at the processing resource, the image recognition on the selected portion of the image.

10. An apparatus, comprising:
a Light Detection and Ranging (LiDAR) sensor;
a user interface; and
a processing resource coupled to the LiDAR sensor and the user interface, wherein the processing resource is configured to:
receive, via the LiDAR sensor, first signaling indicative of at least one of location data, elevation data, or light energy intensity data, or any combination thereof associated with an object;
receive second signaling indicative of data representing an image from an image sensor;
search for photographs on the Internet that match a portion of the image;
receive third signaling indicative of data representing a number of photographs in response to finding the photographs on the Internet that match the portion of the image;
generate, based at least in part on at least one of the first signaling or the third signaling, or any combination thereof, data representing a number of image sensor settings;
transmit to the user interface fourth signaling indicative of the data representing the number of image sensor settings; and
display, at the user interface and based at least in part on the fourth signaling, the data representing the number of image sensor settings.

11. The apparatus of claim 10, wherein the data representing the number of image sensor settings includes a recommendation to adjust framing.

12. The apparatus of claim 10, wherein the data representing the number of image sensor settings includes at least one of focus, brightness, contrast, camera mode, camera type, flash, or exposure length, or any combination thereof.

13. The apparatus of claim 10, further comprising a Global Positioning System (GPS), wherein the GPS is configured to:
generate data representing a location of the apparatus; and
transmit to the processing resource fifth signaling indicative of the data representing the location of the apparatus.

14. The apparatus of claim 13, wherein the processing resource is configured to:

search for photographs on the Internet that were captured within a particular distance from the location of the apparatus; and
receive the third signaling indicative of the data representing the number of photographs in response to finding the photographs on the Internet that were captured within the particular distance from the location of the apparatus.

15. The apparatus of claim 10, comprising a memory, wherein the memory is configured to transmit the number of photographs from the memory to the processing resource in response to receiving a request from the processing resource.

16. The apparatus of claim 10, wherein the user interface is configured to:
display a plurality of photographs;
receive a selection of the number of photographs of the plurality of photographs from a user of the apparatus; and
transmit to the processing resource the third signaling indicative of the data representing the number of photographs.

17. An apparatus, comprising:
a Light Detection and Ranging (LiDAR) sensor;
an image sensor;
a user interface; and
a processing resource coupled to the LiDAR sensor, the image sensor, and the user interface, wherein the processing resource is configured to:
receive, via the LiDAR sensor, first signaling indicative of at least one of location data, elevation data, or light energy intensity data, or any combination thereof associated with an object;
receive, via the image sensor, second signaling indicative of data representing an image of the object;
receive third signaling indicative of data representing a number of photographs;
generate, based at least in part on at least one of the first signaling, the second signaling, or the third signaling, or any combination thereof, data representing a number of image sensor settings;
transmit to the image sensor fourth signaling indicative of the data representing the number of image sensor settings; and
adjust, at the image sensor and based at least in part on the fourth signaling, the data representing the number of image sensor settings;
wherein the user interface is configured to:
receive a selection from a user of the apparatus; and
transmit fifth signaling indicative of data representing a command in response to the user interface receiving the selection; and
wherein the image sensor is configured to capture the image of the object in response to receiving the fifth signaling.

18. The apparatus of claim 17, wherein the data representing the number of image sensor settings includes at least one of brightness, contrast, camera mode, camera type, flash, or exposure length, or any combination thereof.

* * * * *